United States Patent
Neal et al.

(10) Patent No.: US 6,795,107 B1
(45) Date of Patent: Sep. 21, 2004

(54) VIDEO CONFERENCING APPARATUS AND METHOD THEREFOR

(75) Inventors: Danny Marvin Neal, Round Rock, TX (US); Richard A. Kelley, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 09/353,948

(22) Filed: Jul. 15, 1999

(51) Int. Cl.[7] .............................................. H04N 7/14
(52) U.S. Cl. .............................. 348/14.08; 348/14.12; 348/14.1
(58) Field of Search ............................. 348/14, 15, 77, 348/78, 169; 345/331, 332, 330, 420, 355, 419, 473, 474; 582/236, 107

(56) References Cited

U.S. PATENT DOCUMENTS 5,347,306 A * 9/1994 Nitta ............................ 348/15

* cited by examiner

Primary Examiner—Melur Ramakrishnaiah
(74) Attorney, Agent, or Firm—Winstead Sechrest & Minick P.C.; Mark E. McBurney

(57) ABSTRACT

A videoconferencing apparatus and method are implemented. Each participant in the videoconference has a representation within the system as a "stick figure," or linear frame, object similar to "stick figure" objects in the computer animation art. A participant's linear frame object is endowed with the persona of the participant by wrapping the object with an outer texture generated from a preloaded image of the participant. Small tags placed at preselected locations on each participant are detected by the videoconferencing system, and each of the participants stick figures is animated in accordance with changes in positions as revealed by the tags.

31 Claims, 3 Drawing Sheets

VIDEO CONFERENCING APPARATUS AND METHOD THEREFOR

TECHNICAL FIELD

The present invention relates in general to data processing systems, and in particular, to videoconferencing data processing systems.

BACKGROUND INFORMATION

Video conferencing systems in accordance with the prior art require the transmission of a large amount of data to support real time videoconferencing. As a consequence, to limit the volume of the data traffic, the number of sites that may participate in any particular videoconferencing session, must be limited. Even with such limitations, the video motion is typically not smooth but discontinuous or "jerky". Moreover, the image resolution is also typically diminished, and the displayed images possess a discernable granularity. Thus, there is a need in the art for an apparatus and method for increasing the apparent speed of videoconferencing systems.

SUMMARY OF THE INVENTION

The aforementioned needs are addressed by the present invention. Accordingly there is provided, in a first form, a videoconferencing method. The method includes determining changes in position of a predetermined set of reference points on one or more participants. The changes are sent to one or more receivers, and one or more linear frame representations, each corresponding to a conference participant, are animated in response to the respective ones of the changes in position.

There is also provided, in a second form, a videoconferencing data processing unit. The unit contains circuitry operable determining changes in position of a predetermined set of reference points on one or more participants. The changes are sent by circuitry operable for sending information to one or more receivers, and circuitry operable for animating one or more linear frame representations corresponding to the one or more participants animates the linear frame representations in response to the changes in position.

Additionally, there is provided, in a third form, a computer program product operable for storage on storage media, the program product operable for videoconferencing. The program product includes programming for determining changes in position of a predetermined set of reference points on one or more participants. The changes are sent to a receiver by programming included therefor, and programming for animating one or more linear frame representations corresponding to the one or more participants in response to the changes in position animates the linear frame representations in response to the changes.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
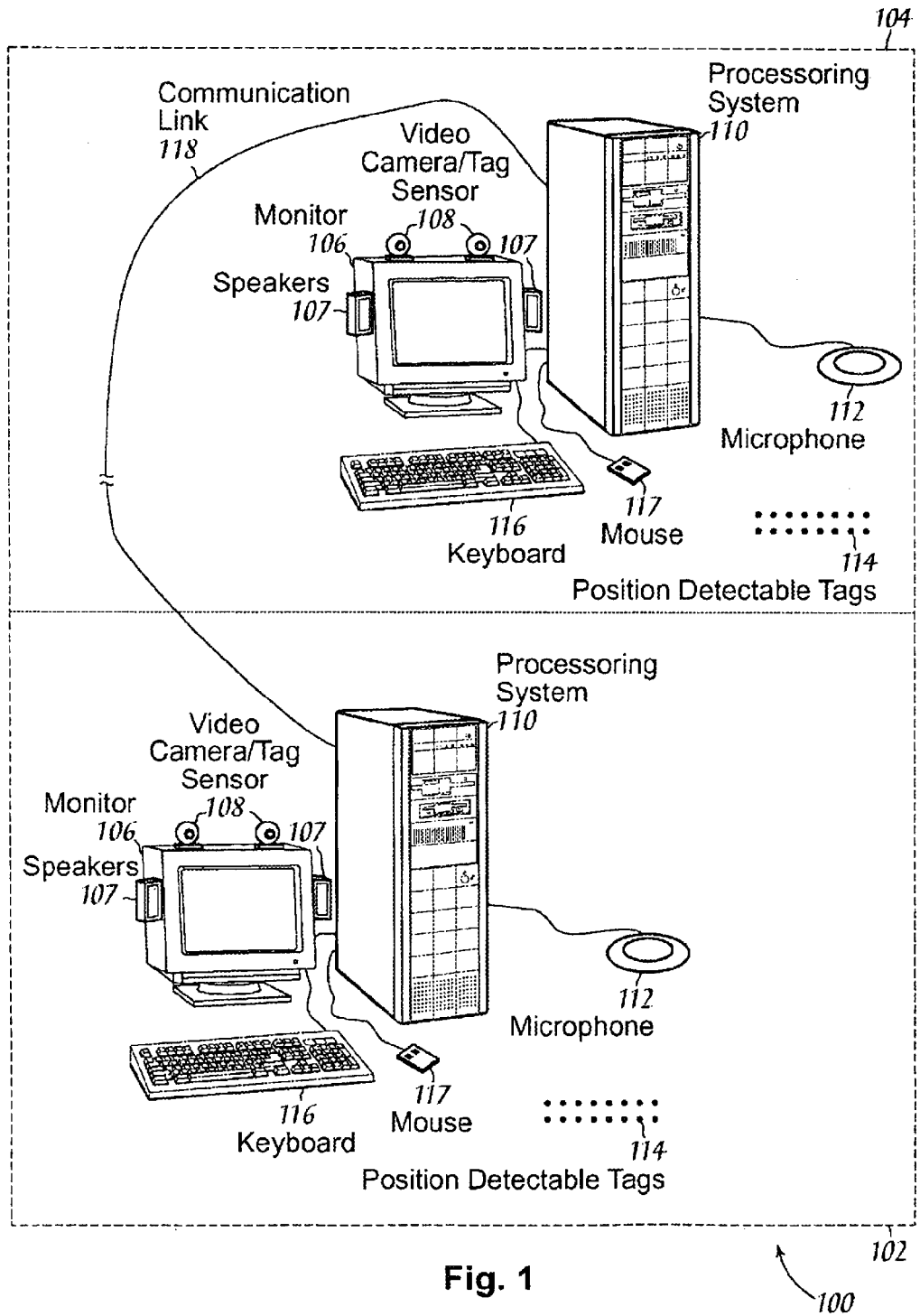
FIG. 1 illustrates a videoconferencing system in accordance with an embodiment of the present invention.

A videoconferencing apparatus and method are provided. Each participant in the videoconference has a representation within the system as a "stick figure" object similar to stick figure objects in the computer animation art. (Stick figure representations of objects will hereinafter be referred to as linear frame representations.) Modern computer animated graphics use linear frame ("stick figure") computer representations of moveable objects, such as people or animals. These linear frame stick elements of an object can then be manipulated via an animation application to give the objects motion. A participant's linear frame object is endowed with the persona of the participant by wrapping the linear frame object with an outer texture generated from an image of the participant. Small tags placed at preselected locations on each participant are detected by the videoconferencing system, and each of the participants linear frames is animated in accordance with changes in positions as revealed by the tags.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Refer now to FIG. 1 illustrating videoconferencing system 100 including videoconferencing facilities 102 and 104 in accordance with the present invention. Each of facilities 102 and 104 includes a monitor 106 for displaying video images, speakers 107, video camera/tag sensors 108 for capturing a video image of the teleconference scene and providing the video signal to videoconferencing processing system 110. The interconnection of video camera/tag sensors 108 and videoconferencing processing system 110 will be further described in conjunction with FIG. 2 below. Table microphone 112 captures the teleconference sound and generates audio signals which are also input to videoconferencing processing system 110. Position detectable tags 114 are provided for application to the conference participants. For example, a plurality of position detectable tags 114 may be applied at locations on the face, hands, and other key parts of the body of each conference participant. Position detectable tags 114 may be sufficiently small to be inconspicuous to the other conference participants, but may be detected by the videoconference system software running in processing system 110 via the video signal generated in response thereto by video camera/tag sensors 108. This will be discussed further below in conjunction with FIG. 3. Video conference facilities 102 and 104 also include a keyboard 116 coupled to processing system 110 for receiving user input, such as commands to initiate a videoconference session. Additional input devices include mouse 117 which may serve as an alternative input means, particularly in combination with a graphical user interface (GUI). Video and audio data are communicated between facilities 102 and 104 via communications link 118, which in an embodiment of the present invention may be a standard telephone line that may be interfaced with processing system 110 via a modulator/demodulator (modem), discussed further in conjunction with FIG. 2. Additionally, communications between facilities 102 and 104 may be via a standard local area network (LAN) or a wide area network (WAN).

Figure 2:
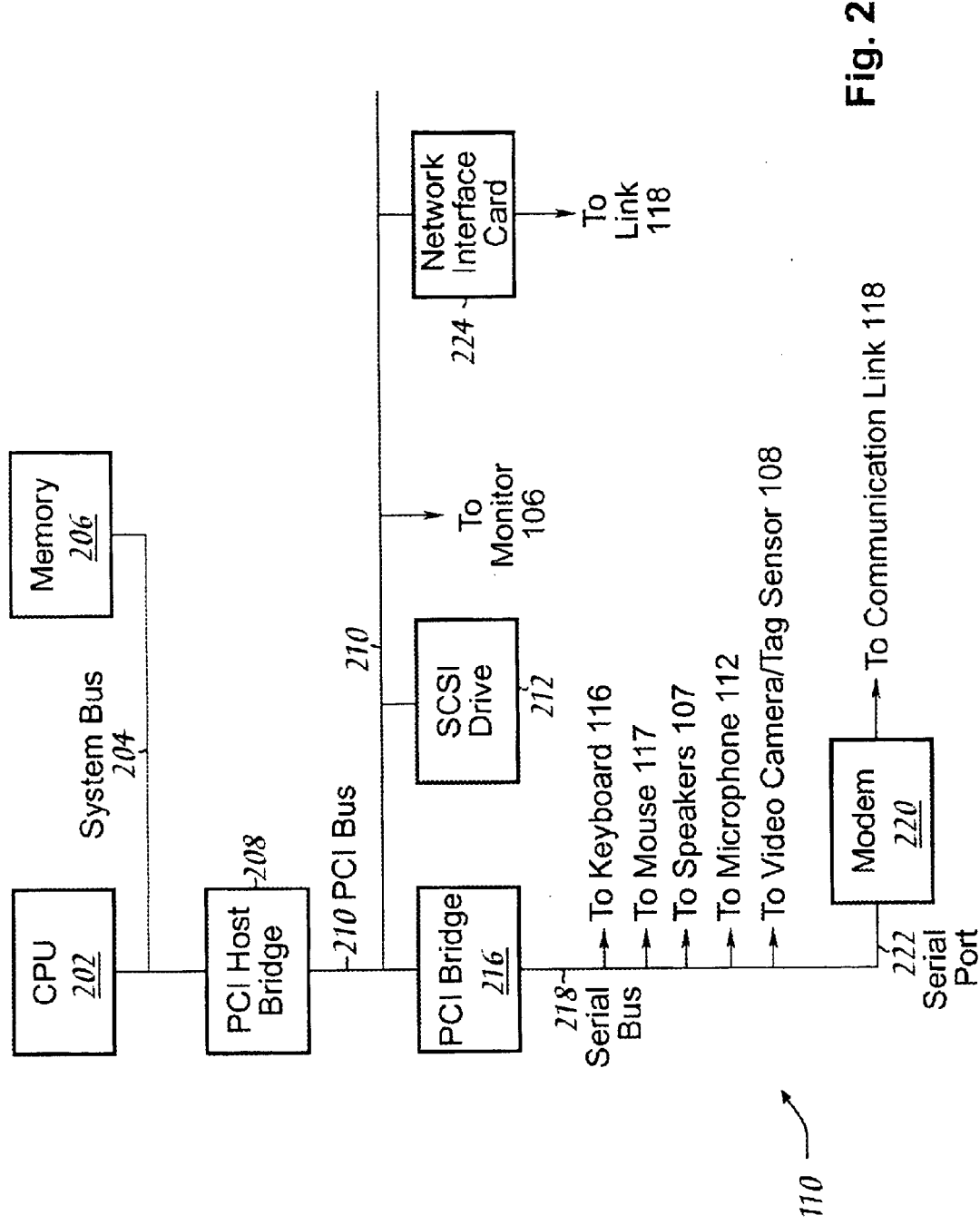
FIG. 2 illustrates, in block diagram form, a videoconferencing data processing system in accordance with an embodiment of the present invention.

FIG. 2 illustrates videoconferencing processing system 110 in further detail. Videoconferencing processing system 110 includes CPU 202 coupled via system bus 204 to memory 206, which memory is operable for holding a set of program instructions for CPU 202 that implement the videoconferencing methodology of the present invention, described in conjunction with FIG. 3 below. Also coupled to system bus 204 is Peripheral Component Interface (PCI) host bridge 208. PCI host bridge 208 interfaces system bus 204 with PCI bus 210. The PCI bus is a known input/output (I/O) bus in the data processing art. I/O devices coupled to PCI bus 210 include Small Computer System Interface (SCSI) drive 212 and monitor 106, FIG. 1. The software implementing the videoconferencing methodology in accordance with the present invention, which may be located in memory 206 for execution by CPU 202, may be stored in SCSI drive 212, and loaded into memory 206 prior to its execution by CPU 202. Video information is processed by CPU 202 under the control of the program of instructions loaded in memory 206, and displayed on monitor 106.

Additionally, PCI serial bridge 216 interfaces PCI bus 210 to serial bus 218. In an embodiment of the present invention, serial bus 218 may be a Universal Serial Bus (USB). The USB is a known bus architecture in the data processing art. A plurality of serial devices reside on serial bus 218, including keyboard 116, video camera/tag sensor 108, microphone 112, and mouse 117. Additionally, serial bus 218 is coupled to modem 220 via serial port 222. Modem 220 provides the interface to communications link 118, FIG. 1. Video signals received from video camera 106 are communicated to CPU 202 via serial bus 218, PCI bridge 216, PCI bus 210, PCI host bridge 208 and system bus 204. Video data is processed by CPU 202 under the control of programming software in memory 206, implementing the methodology of FIG. 3, described below. The video data may be used to generate a scene on video display 214. Additionally, the video data may be used to generate video information to be sent to a second videoconferencing facility for generating a display by a corresponding processing system 110 therein. (Although described herein in terms of a first and second videoconferencing facilities, such as facilities 102 and 104 in FIG. 1, it would be understood by an artisan of ordinary skill that a videoconferencing system, such as system 100, FIG. 1, may accommodate a plurality of facilities and such an embodiment would be within the spirit and scope of the present invention.) The video information is generated by CPU 202 in response to the video signals received from video camera 106, and is communicated via PCI host bridge 208, PCI bus 210, PCI bridge 216, serial bus 218 through serial port 222 to modem 220 which converts the information to a format suitable for transmission over communication link 118 embodied in an analog communication circuit, for example, conventional telephone lines. In the second, receiving, videoconferencing facility, the data path is reversed. The data is coupled from the communications link 118 to serial port 220 via modem 220 and thereby over serial bus 218 to PCI bridge 216, to PCI bus 210, and to CPU 202 via PCI host bridge 208 and system bus 204. Alternatively, communications link 118 may be embodied in a LAN or WAN, interfaced to system 110 via network interface card 224 coupled to PCI bus 210. For example, network interface card 224 may, in an embodiment of the present invention, be an Ethernet card. Other embodiments may include a token ring; however, it would be understood by an artisan of ordinary skill that the present invention may be practiced using a variety of types of communication link 118 and such embodiments would be within the spirit and scope of the present invention. The video information is processed by CPU 202 under the control of software programming loaded in memory 206, implementing the methodology of FIG. 3 to generate a video graphics scene for display on monitor 106 in the receiving videoconference facilities, such as one of videoconference facilities 102 and 104 in FIG. 1.

Figure 3:
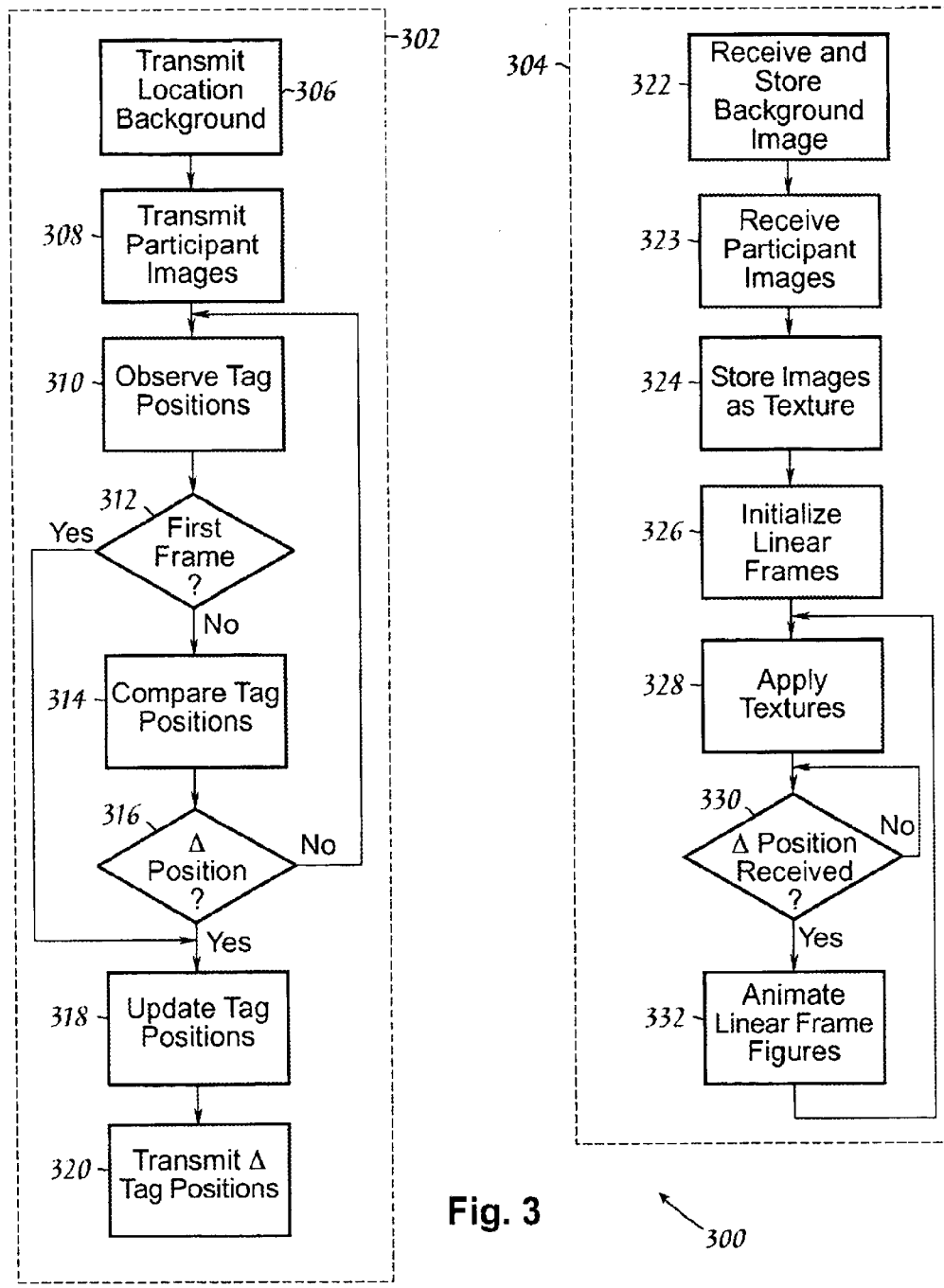
FIG. 3 illustrates, in flow chart form, a videoconferencing method in accordance with an embodiment of the present invention.

Refer now to FIG. 3 illustrating videoconference methodology 300 in accordance with the present invention. Methodology 300 includes two subprocesses. Subprocess 302, which may be referred to as a source process, is performed by a the videoconference facility such as one of videoconference facilities 102 or 104 in FIG. 1 for sourcing video information to other videoconference facilities. Subprocess 304, which may be referred to as a receiver subprocess, generates a graphics display using video information originated by a source facility. It would be understood by an artisan of ordinary skill that the videoconferencing processing system in each facility such as system 110 in each of facilities 102 and 104, FIG. 1, may execute both subprocess 302 and subprocess 304.

Subprocess 302 begins, in step 306 by transmitting the location background video information. This is a one time transmission which includes all of the details of the conference room. The data rate of the transmission may be sufficiently low, consistent with data rates supported by relatively low bandwidth link 118, such as a standard telephone line, because the transmission is a one-time event and thus a transmission time of several seconds may be relatively insignificant. Similarly, in step 308, a one-time transmission of images of the individual participants in the conference from their conference position is made. The information transmitted in step 308 includes all of the detail of the features of the participants, and as in the transmission of the location background in step 306, may take several seconds.

In step 310, the positions of the position detectable tags placed at locations on the conference participants, such as position detectable tags 114, FIG. 1, are observed. A means of detection of the tag's relative positions and motion, is for the tags to be sensed via directional sensitive Radio Frequency (RF) signaling between the tags and the video conferencing system. Two directional sensors can be utilized to locate and monitor the motion of each of the tags. This approach supports multiple participants at each video conference location. In an alternative embodiment, a position detectable "lip gloss" placed on the mouth and hands of the participants may be used in place of the tags. This, alternative, embodiment would be a less expensive approach that would support a single conference participant at each video conference location. The preferred means of detection of the "lip gloss" relative positions and motion, is for the "lip gloss" material to be sensed by the video conferencing system via infrared directional sensors. The "lip gloss" would enhance the infrared image to make the "lip gloss" appear as hotter spots in the infrared image.

In step 312, it is determined if a current video frame is a first frame. If not, the tag positions in the current frame are compared with the tag positions in a previous frame in step 314. If the positions have changed, step 316, indicating that one or more participants have moved, in step 318 the tag positions are updated, and in step 320, the difference in the tag positions are transmitted to the receiving videoconference facility. The data sent represents the three-dimensional motion of a few reference points on each of the participants and permits the motion to be transmitted over relatively low bandwidth communication channels, such as a standard telephone line embodying link 118, FIG. 1. If, however, in step 316, there has been no change in the tag positions, then subprocess 302 returns to step 310.

Returning to step 312, if it is determined that the current frame was the first frame then methodology 300 proceeds to step 318 wherein the tag positions are updated as initial tag positions. These may be in the form of differences from a predetermined set of fiducial, or reference, positions. These are transmitted to the second videoconference facility in step 320, wherein they are used to initialize linear frame representations of the participants, as discussed below in conjunction with subprocess 304. Methodology 300 then returns to step 310.

Receiving subprocess 304, in step 322 receives and stores the background image transmitted in step 306 of the source facilities subprocess 302. In step 323, the receiving facility receives a participant image sent in step 308 by the source facility. In step 324, the images received in step 322 and step 323 are stored as textures. Textures are known in the graphics processing art, and constitute rectangular arrays of graphics data, such as color and intensity data. Textures may be "appliqued" to a graphics primitive in order to draw a portion of the image or pattern represented by the texture as a single primitive.

In step 326, linear frame representations of each of the teleconference participants are initialized. The linear frame representations are initialized using the tag positions as determined from the first frame in subprocess 302, and which are transmitted in step 320 thereof. Additionally, a human linear frame representation may be initialized with a size and shape to accommodate the build of the individual participant. In step 328, the textures stored in step 324 are applied to the linear frames, thereby "fleshing-out" the linear frame representations and personalizing the linear frames to the shape of the corresponding conference participants. The graphics images are then rendered and displayed.

In step 330, methodology 300 loops while determining if a difference in tag positions is received. The differences in tag positions are transmitted in step 320 of subprocess 302. If, in step 330 a difference in position is received, then in step 332, the difference in position is used to animate the linear frame representations of the conference participants. Methodology 300 then returns to step 328 to apply the textures to the now animated linear frame to render the depictions of the conference participants in accordance with the movements generated by the received changed positions. Methodology 300 then continues looping in step 330 waiting for the next position change implementing the animation of the conference participants.

In this way, apparatus and methods for video teleconferencing is provided. By using position detectable tags to pick up the three-dimensional motion of key parts of videoconference participants' face and body, a reduced amount of data may be used to represent the image of the individual, and the animations thereof. The linear frame representations of the conference participants are "personalized" by using a texture, generated from a one-time transmission of each participants' image.

Although the present invention and its advantages have been described in detail, it should be understood that various changes, substitutions and alterations can be made herein without departing from the spirit and scope of the invention as defined by the appended claims.

What is claimed is:

1. A videoconferencing method comprising the steps of:
   determining changes in position of a predetermined set of reference points on one or more participants;
   sending said changes in position to one or more receivers; and
   in said one or more receivers, animating one or more linear frame representations corresponding to said one or more participants in response to said changes in position.

2. The method of claim 1 wherein said step of determining changes in position includes the step of detecting positions of a plurality of tags placed on said one or more participants.

3. The method of claim 2 wherein said tag comprises a coordinate position detectable composition.

4. The method of claim 1 wherein said step of animating said one or more linear frame representations comprises the step of translating points on said one or more linear frame representations corresponding to said set of reference points by said changes in position.

5. The method of claim 1 further comprising the step of applying one or more textures representing an image of a corresponding one of said one or more participants to a corresponding one of said one or more linear frame representations.

6. The method of claim 5 wherein said one or more textures is generated in response to a corresponding video image of said one or more participants sent to said receivers.

7. The method of claim 1 wherein said step of sending said changes in position comprises the step of transmitting said changes via a video data link.

8. The method of claim 1 wherein said step of sending said changes in position comprises the step of transmitting said changes via a telecommunications link.

9. The method of claim 8 wherein said telecommunications link comprises a telephone line.

10. The method of claim 1 wherein said step of determining said changes in position comprises the step of determining a difference between a current position of each of said set of reference points and a previous position of each of said set of reference points.

11. A data processing unit comprising:
    circuitry operable for determining changes in position of a predetermined set of reference points on one or more participants;
    circuitry operable for sending said changes in position to one or more receivers; and
    circuitry in said one or more receivers operable for animating one or more linear frame representations corresponding to said one or more participants in response to said changes in position.

12. The unit of claim 11 wherein said circuitry operable for determining changes in position includes circuitry operable for detecting positions of a plurality of tags placed on said one or more participants.

13. The unit of claim 12 wherein said tag comprises a coordinate position detectable composition.

14. The unit of claim 13 wherein said circuitry operable for animating said one or more linear frame representations comprises circuitry operable for translating points on said one or more linear frame representations corresponding to said set of reference points by said changes in position.

15. The unit of claim 11 further comprising circuitry operable for applying one or more textures representing an image of a corresponding one of said one or more participants to a corresponding one of said one or more linear frame representations.

16. The unit of claim 15 wherein said one or more textures is generated in response to a corresponding video image of said one or more participants sent to said receivers.

17. The unit of claim 11 wherein said circuitry operable for sending said changes in position comprises circuitry operable for transmitting said changes via a video data link.

18. The unit of claim 11 wherein said step of sending said changes in position comprises the step of transmitting said changes via a telecommunications link.

19. The unit of claim 18 wherein said telecommunication link comprises a telephone line.

20. The unit of claim 11 wherein said circuitry operable for determining said changes in position comprises circuitry operable for determining a difference between a current position of each of said set of reference points and a previous position of each of said set of reference points.

21. A computer program product operable for storage on storage media, the program product operable for videoconferencing, the program product comprising:
   programming for determining changes in position of a predetermined set of reference points on one or more participants;
   programming for sending said changes in position to one or more receivers; and
   programming for animating one or more linear frame representations corresponding to said one or more participants in response to said changes in position.

22. The program product of claim 21 wherein said programming for determining changes in position includes programming for detecting positions of a plurality of tags placed on said one or more participants.

23. The program product of claim 22 wherein said tag comprises a coordinate position detectable composition.

24. The program product of claim 23 wherein said programming for animating said one or more linear frame representations comprises programming for translating points on said one or more linear frame representations corresponding to said set of reference points by said changes in position.

25. The program product of claim 21 further comprising programming for applying one or more textures representing an image of a corresponding one of said one or more participants to a corresponding one of said one or more linear frame representations.

26. The program product of claim 25 wherein said one or more textures is generated in response to a corresponding video image of said one or more participants sent to said receivers.

27. The program product of claim 21 wherein said programming for sending said changes in position comprises programming transmitting said changes via a video data link.

28. The program product of claim 21 wherein said step of sending said changes in position comprises the step of transmitting said changes via a telecommunications link.

29. The program product of claim 28 wherein said telecommunication link comprises a telephone line.

30. The program product of claim 21 wherein said programming for determining said changes in position comprises programming for determining a difference between a current position of each of said set of reference points and a previous position of each of said set of reference points.

31. A videoconferencing method comprising the steps of:
   transmitting a videoconference location background image to one or more receivers;
   transmitting images of one or more videoconference participants to said one or more receivers;
   storing said location background image and said one or more participant images as textures in said one or more receivers;
   comparing a first position of a predetermined set of reference points on said one or more participants and a second position of said predetermined set of reference points;
   determining a change in position of said predetermined set of reference points in response to said step of comparing said first and second positions;
   in said one or more receivers, initializing one or more linear frame representations corresponding to each of said one or more participants;
   in said one or more receivers, applying stored textures representing said one or more participants to a corresponding one of said linear frame representations;
   sending said change in position to said one or more receivers;
   in said one or more receivers, animating said linear frame representations in response to a corresponding change in position of said predetermined set of reference points; and
   in said one or more receivers, repeating said step of applying stored textures in response to said animating step.

* * * * *